(12) United States Patent
Pistre et al.

(10) Patent No.: US 10,539,698 B2
(45) Date of Patent: Jan. 21, 2020

(54) DETERMINING A QUANTITATIVE BOND USING SIGNAL ATTENUATION

(71) Applicant: Schlumberger Technology Corporation, Sugar Land, TX (US)

(72) Inventors: Vivian Pistre, Petaling Jaya Selangor (MY); Toshihiro Kinoshita, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 87 days.

(21) Appl. No.: 14/735,079

(22) Filed: Jun. 9, 2015

(65) Prior Publication Data
US 2015/0369939 A1 Dec. 24, 2015

Related U.S. Application Data

(60) Provisional application No. 62/013,542, filed on Jun. 18, 2014.

(51) Int. Cl.
*G01V 1/50* (2006.01)
*E21B 47/00* (2012.01)

(52) U.S. Cl.
CPC ............ *G01V 1/50* (2013.01); *E21B 47/0005* (2013.01)

(58) Field of Classification Search
CPC .............................. G01V 1/50; E21B 47/0005
USPC .................................. 367/28–30, 35; 181/105
See application file for complete search history.

(56) References Cited

U.S. PATENT DOCUMENTS

| | | | |
|---|---|---|---|
| 3,618,001 A * | 11/1971 | Zill | G01V 1/44 340/854.9 |
| 4,630,243 A * | 12/1986 | MacLeod | G01V 3/28 175/42 |
| 4,703,427 A | 10/1987 | Catala et al. | |
| 4,757,479 A | 7/1988 | Masson et al. | |
| 5,089,989 A * | 2/1992 | Schmidt | E21B 47/0005 181/102 |
| 6,371,207 B1 * | 4/2002 | Reynolds | E21B 21/00 166/153 |
| 2003/0156494 A1 * | 8/2003 | McDaniel | G01V 1/44 367/35 |

(Continued)

FOREIGN PATENT DOCUMENTS

| EP | 0263028 | 9/1986 |
|---|---|---|
| EP | 0261825 A2 | 3/1988 |

(Continued)

OTHER PUBLICATIONS

European Search Report for International Application No. 15171994.5. dated Jun. 27, 21016. (4 pgs).

(Continued)

*Primary Examiner* — Ian J Lobo

(57) ABSTRACT

A technique facilitates determination of a quantitative bond between a pipe and adjacent materials, e.g. between a wellbore casing and adjacent cement. The quantitative bond is established via acoustic measurements related to signal attenuation. Additionally, the acoustic measurements may be conducted with a sonic tool during a wellbore operation, e.g. during a drilling operation. The methodology enables use of signal attenuation in a manner which facilitates determination of bond index coverage up to a high percentage, e.g. 100 percent.

18 Claims, 9 Drawing Sheets

(56) References Cited

U.S. PATENT DOCUMENTS

| | | | |
|---|---|---|---|
| 2006/0262644 A1 | 11/2006 | Schoepf et al. | |
| 2007/0299614 A1* | 12/2007 | Dewarrat | G01V 1/28 702/16 |
| 2009/0168597 A1* | 7/2009 | Wu | E21B 47/0005 367/35 |
| 2014/0114892 A1* | 4/2014 | Quirein | E21B 47/0005 706/20 |
| 2014/0236357 A1 | 8/2014 | Degrange | |
| 2015/0177404 A1* | 6/2015 | Pabon | G01V 1/46 367/28 |

FOREIGN PATENT DOCUMENTS

| | | |
|---|---|---|
| EP | 0443936 | 8/1991 |
| WO | 2013/096565 | 6/2013 |

OTHER PUBLICATIONS

Pistre et al. "Attenuation-Based Quantitative Cement Bond Index with LWD Sonic: A Novel Approach Applicable to all Casing and Cement Cases." Oct. 27, 2014 (18 pages).

Kinoshita et al. "Feasibility and Challenge of Quantitative Cement Evaluation With LWD Sonic." Sep. 30, 2013, XPO55272903, ISBN: 978-1-61399-240-1. (10 pages).

"Identifying Top of Cement While Drilling Saves 1 ½ Days of Rig Time—Case Study: Sonic Scope 475 service helps operators save additional rig time for cement evaluation," Schlumberger, 2010 at www.slb.com/SonicScope.

"Sonic Scope 475 Top-of-Cement Identification—Using multipole sonic-while-drilling service," Schlumberger Fact Sheet, 2010 at www.slb.com/SonicScope.

"Top-Of-Cement (TOC) Evaluation Saves Rig Time—Case Study: Sonic Scope 475 relogged inside casing helps interpret cement bonding and free pipe zones," Schlumberger, 2010 at www.slb.com/SonicScope.

M. Blyth, et al., "LWD Sonic Cement Logging: Benefits, Applicability and Novel Uses for Assessing Well Integrity," SPE/IADC 163461, SPE/IADC Drilling Conference and Exhibition, Mar. 5-7, 2013.

M. Grosmangin, et al., "A Sonic Method for Analyzing the Quality of Cementation of Borehole Casings," Journal of Petroleum Technology, vol. 13, No. 2, 1961, pp. 165-171.

J. Degrange et al., "Sonic While Drilling: Multipole Acoustic Tools for Multiple Answers," IADC/SPE 128162, IADC/SPE Drilling Conference and Exhibition, Feb. 2-4, 2010.

C.V. Kimball, et al., "Semblance processing of borehole acoustic array data," Geophysics, 49, 1984, pp. 274-281.

T. Kinoshita, et al., "Feasibility and Challenge of Quantitative Cement Evaluation with LWD Sonic," SPE 166327, SPE Annual Technical Conference and Exhibition, Sep. 30-Oct. 2, 2013.

J. Longo, et al., "Logging-While-Drilling Cement Evaluation: A Case Study from the North Slope, Alaska," SPE 159819, SPE Annual Technical Conference and Exhibition, Oct. 8-10, 2012.

E. Nelson and D. Guillot, 2006, "Well Cementing Second Edition," Schlumberger.

G.H. Pardue, et al., "Cement Bond Log-A Study of Cement and Casing Variables," Journal of Petroleum Technology, vol. 15, No. 5, 1963, pp. 545-554, SPE paper 453.

U.S. Appl. No. 14/558,560, filed Dec. 2, 2014.

\* cited by examiner

Apparent Attenuation

DETERMINING A QUANTITATIVE BOND USING SIGNAL ATTENUATION

CROSS-REFERENCE TO RELATED APPLICATION

The present document is based on and claims priority to U.S. Provisional Application Ser. No. 62/013,542, filed Jun. 18, 2014, incorporated herein by reference.

BACKGROUND

Wellbores are drilled to locate and produce hydrocarbons. A downhole drilling tool with a bit at an end thereof is advanced into the ground to form a wellbore. As the drilling tool is advanced, drilling mud is pumped through the drilling tool and out the drill bit to cool the drilling tool and carry away cuttings. The wellbore may be completed in preparation for production. During completion, the wellbore may be provided with cement to line the wellbore and to secure casing in the wellbore. Production equipment may be positioned along the wellbore to draw subsurface fluids, such as hydrocarbons, to the surface. In a variety of applications, it is desirable to determine the level of bonding between the casing and the surrounding cement. Various techniques of been employed in an effort to determine the level of bonding. For example, cement bond log (CBL) techniques and discriminated cement bond log (DCBL) techniques have been employed as part of wireline sonic services in an effort to provide a quantitative cement bonding evaluation. However such techniques utilize the amplitude of a sonic signal and have sometimes failed to provide the desired accuracy with respect to determining bonding along the casing. Additionally, such techniques utilize a separate trip downhole which can be costly and time-consuming.

SUMMARY

In general, a system and methodology are provided for determining a quantitative bond, e.g. a quantitative bond index, between a pipe, e.g. a wellbore casing, and an adjacent material, e.g. adjacent cement. The quantitative bond is determined from acoustic measurements related to signal attenuation. Additionally, the acoustic measurements may be conducted with a sonic tool during a wellbore operation, e.g. during a drilling operation. The methodology enables use of signal attenuation in a manner which facilitates determination of bond index coverage up to a high percentage, e.g. 100 percent.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

This disclosure provides a methodology to compute a Quantitative Bond Index of a casing to the cement behind it from acoustic measurements conducted with a sonic tool while drilling, i.e. on a drill collar.

The disclosure herein generally involves a system and methodology which facilitate the analysis and determination of a quantitative bond between a pipe and adjacent material. For example, a quantitative bond index may be determined between a wellbore casing and adjacent cement. The quantitative bond index is determined from acoustic measurements related to signal attenuation. Additionally, the acoustic measurements may be conducted with a bond analysis tool, e.g. sonic tool, during a wellbore operation, e.g. during a drilling operation. In some applications, the bond analysis tool comprises a logging-while-drilling tool. The methodology enables use of signal attenuation in a manner which enables determination of bond index coverage up to a high percentage, e.g. 100 percent. The methodology also enables evaluation of a quantitative bond during a single trip downhole in conjunction with another operation, such as a drilling operation. In some applications, a quantitative bond index may be determined during a lateral borehole drilling operation.

When the bond analysis tool is in the form of a sonic tool, sound may be used to determine if a pipe, e.g. casing, is free to ring or restricted, e.g. restricted via cement surrounding the casing. As described in the embodiments below, this general technique may be used to establish a quantitative bond index along the pipe, e.g. casing, using signal attenuation. The technique enables a dependable and repeatable approach to determining the quantitative bond index up to a high percentage along the desired sections of pipe which facilitates subsequent decisions, such as decisions on drilling of lateral boreholes.

The technique also enhances knowledge and facilitates decision-making with respect to whether repairs to the cement along a given section of the pipe should be implemented. In various applications, the system and methodology facilitates calibration of the bond analysis tool by performing normalization of data to a completely free pipe and to a fully constrained pipe. Effectively, the ability to normalize enables quantification of the cement-to-casing bond index with fewer or no correction/compensation factors. The technique provides a dependable and repeatable approach even in the presence of a variety of factors, such as fluid in the pipe, pipe structure, pipe collars, e.g. casing collars, and/or other factors.

Figure 1:
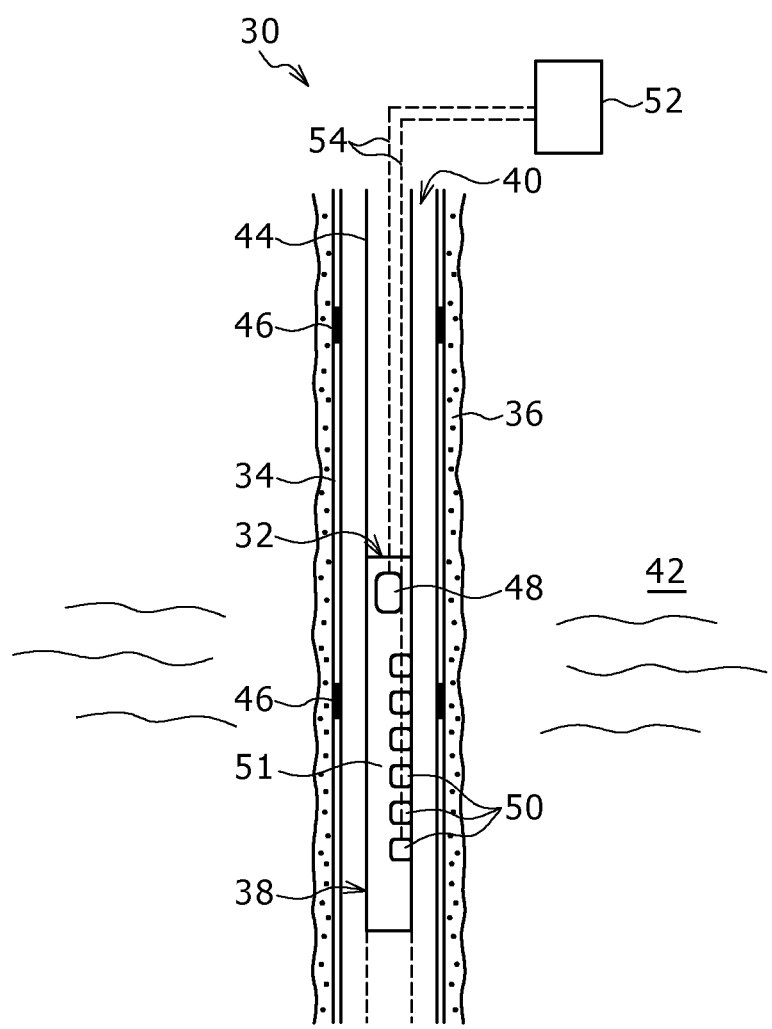
FIG. 1 is a schematic illustration of a well string having an example of a bond analysis tool deployed in a cased and cemented wellbore extending into a subterranean formation, according to an embodiment of the disclosure.

Referring generally to FIG. 1, an example of a well system 30 is illustrated in which a bond analysis tool 32 is employed in determining a quantitative bond index between a pipe 34, e.g. casing, and a surrounding layer of cement 36. In this embodiment, the bond analysis tool 32 is part of a well string 38 and is deployed downhole into a borehole 40, e.g. a wellbore, lined by pipe/casing 34. The borehole 40 extends into or through a formation 42, and the bond analysis tool 32 may be deployed downhole into the borehole 40 via a suitable conveyance 44, such as jointed pipe where the bond analysis tool 32 is in the form of a drill collar. In the particular example illustrated, pipe 34 is the form of casing having a plurality of casing collars 46 coupling adjacent sections of pipe/casing 34. By way of example, well string 38 may comprise a drill string and the bond analysis tool 32 may be deployed downhole in a single trip with the drill string 38 during a drilling operation, e.g. during a lateral borehole drilling operation.

By way of example, the bond analysis tool 32 is in the form of a sonic tool having at least one acoustic transmitter 48 and a plurality of acoustic receivers 50. By way of example, the bond analysis tool 32 may be in the form of a logging-while-drilling tool 51 that is in the form of a drill collar. In the example illustrated, the acoustic transmitter 48 emits a signal outwardly toward the surrounding casing 34 and the acoustic receivers 50 sense the acoustic signal which is reflected back to the bond analysis tool 32. The transmitter 48 and receivers 50 may be communicatively coupled with a control system 52, such as a processor-based control system via communication lines 54. The communication lines 54 may have hardwired and/or wireless portions able to convey, for example, control signals to transmitter 48 and data on the acoustic signals detected by receivers 50. In some applications, the control system 52 may be in the form of a computer-based control system positioned at a suitable surface location.

By way of example, control system 52 may comprise a variety of processor-based systems, including computer-based systems coupled with communication lines 54 to provide control signals to transmitter 48 and to receive data from receiver/sensors 50. The control system 52 may be used to process data on the received acoustic signals via suitable software according to parameters and algorithms as described in greater detail below.

In this example, the control system 52 may comprise a processor 56 in the form of a central processing unit (CPU). The processor 56 is operatively employed to intake and process data obtained from the receivers 50 of bond analysis tool 32. The receivers/sensors 50 may comprise various types of acoustic sensors able to detect acoustic signals. In some applications, the bond analysis tool 32 also may comprise other types of sensors coupled with the processor 56 and positioned at various locations along the well string 38 and/or casing 34.

Figure 2:
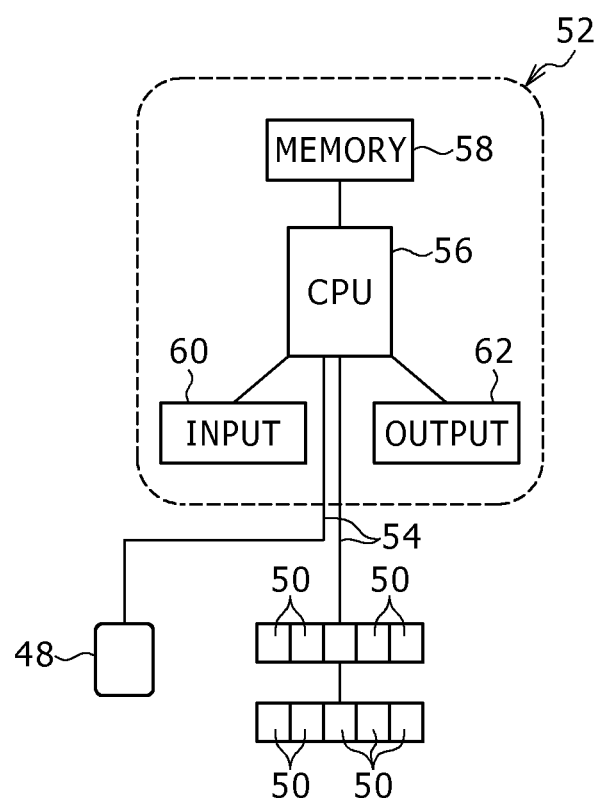
FIG. 2 is a schematic illustration of an example of a processor-based control system for processing data from the bond analysis tool, according to an embodiment of the disclosure.

In the example illustrated in FIG. 2, the processor 56 may obtain data in real time and/or may utilize stored data. The processor 56 may be operatively coupled with a memory 58, an input device 60, and an output device 62. Memory 58 may be used to store many types of data, such as data collected and updated via receivers 50. Input device 60 may comprise a variety of devices, such as a keyboard, mouse, voice recognition unit, touchscreen, other input devices, or combinations of such devices. Output device 62 may comprise a visual and/or audio output device, such as a computer display, monitor, or other display medium having a graphical user interface. Additionally, the processing may be done on a single device or multiple devices locally, at a remote location, or with some local devices and other devices located remotely, e.g. a server/client system.

As described in greater detail below, the bond analysis tool 32, in cooperation with control system 52, may be employed to provide a quantitative bond index between the casing 34 and the surrounding cement 36 via evaluation of amplitude and attenuation of a sonic signal emitted by transmitter 48. The system and methodology described herein uniquely utilize signal attenuation behavior. With respect to bond analysis tool 32, the measurement of amplitude can be made at various spacing for the receivers 50 along the array of receivers 50 and an observed attenuation rate can be computed. For example, consider logging tool 51 placed in a casing section that features a given attenuation rate between transmitter 48 and receivers 50, as well as a different one along the receiver array, thus displaying two attenuation rates below and above the bottom receiver 50 of the array as illustrated in FIG. 3.

Figure 3:
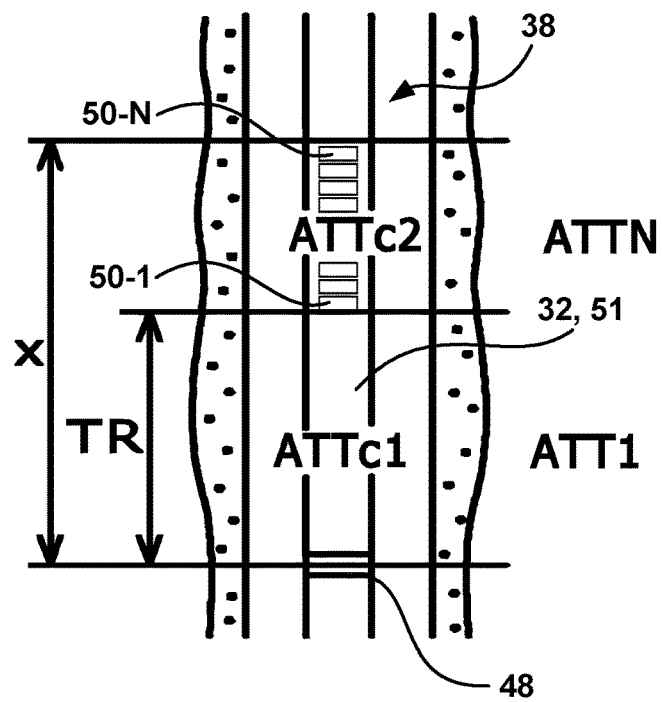
FIG. 3 is a schematic view of a wellbore into which an example of the bond analysis tool may be deployed and having various analysis parameters illustrated, according to an embodiment of the disclosure.

With reference to FIG. 3, the illustrated terms can be defined as follows with respect to the transmitter 48 and the receivers 50, as labeled 50-1 to 50-N:

A0: Amplitude of the transmitter 48 after loss in the mud, i.e. effective amplitude a percentage of the transmitter effective amplitude going inside the tool 32, 51 that is in the form of a drill collar.

ATT1: Attenuation rate of the casing 34 below the first receiver 50-1 (at a distance from transmitter 48 equal to TR ft).

ATTc1: Attenuation rate of the tool 32, 51 that is in the form of the drill collar below the first receiver 50-1.

ATTN: Attenuation rate of the casing 34 above the first receiver 50-1 (beyond distance TR), i.e. the attenuation to extract.

ATTc2: Attenuation rate of the tool 32, 51 that is in the form of the drill collar above the first receiver 50-1.

In this example, ATTc1 and ATTc2 are parameters specific to the tool design. A0 depends on the borehole fluid, hence temperature and pressure, and is thus unknown. Likewise, the ratio α is dependent on pressure, temperature and fluid type as well as the attenuation below the array ATT1, and is also not known at a given tool position in the well.

The amplitude of a drill collar arrival at the bottom of the array of receivers 50 is:

$$AbotCol = A0 * \alpha * 10^{-\left(ATTc1 * \frac{TR}{20}\right)} \quad (1)$$

The casing arrival amplitude at the bottom of the array is:

$$AbotCas = A0 * (1 - \alpha) * 10^{-\left(ATT1 * \frac{TR}{20}\right)} \quad (2)$$

The sum of these amplitudes is:

$$Abot = A0 * \left[\alpha * 10^{-\left(ATTc1 * \frac{TR}{20}\right)} + (1-\alpha) * 10^{-\left(ATT1 * \frac{TR}{20}\right)}\right] \quad (3)$$

$$Abot = A0 * 10^{-\left(ATT1 * \frac{TR}{20}\right)}\left[(1-\alpha) + \alpha * \frac{10^{-\left(ATTc1 * \frac{TR}{20}\right)}}{10^{-\left(ATT1 * \frac{\alpha}{20}\right)}}\right]$$

$$Abot = A0 * 10^{\left(-ATT1 * \frac{TR}{20}\right)}\left[(1-\alpha) + \alpha * 10^{-(ATTc1-ATT1)*\frac{TR}{20}}\right]$$

Similarly at a receiver placed at a distance x from the transmitter, the collar amplitude is:

$$AtopCol = AbotCol * 10^{-\left(ATTc2 * \frac{x-TR}{20}\right)}$$

The casing amplitude is:

$$AtopCas = AbotCas * 10^{-\left(ATTN * \frac{x-TR}{20}\right)}$$

And the sum of the two:

$$Atop = AbotCol * 10^{-\left(ATTc2 * \frac{x-TR}{20}\right)} + AbotCas * 10^{-\left(ATTN * \frac{x-TR}{20}\right)}$$

Incorporating equations (1) and (2) for the drill collar and casing amplitude at the bottom of the array of receivers 50 the amplitude obtained is:

$$Atop = A0 * \alpha * 10^{-\left(ATTc1 * \frac{TR}{20}\right)} * 10^{-\left(ATTc2 * \frac{x-TR}{20}\right)} + \quad (4)$$

$$A0 * (1-\alpha) * 10^{-\left(ATT1 * \frac{TR}{20}\right)} * 10^{-\left(ATTN * \frac{x-TR}{20}\right)}$$

$$Atop = A0 * \left[\alpha * 10^{-\left(ATTc1 * \frac{TR}{20}\right)} * 10^{-\left(ATTc2 * \frac{x-TR}{20}\right)} + \right.$$

$$\left. (1-\alpha) * 10^{-\left(ATT1 * \frac{TR}{20}\right)} * 10^{-\left(ATTN * \frac{x-TR}{20}\right)}\right]$$

$$Atop = A0 * \left[\alpha * 10^{-\left(ATTc1 * \frac{TR}{20} + ATTc2 * \frac{x-TR}{20}\right)} + \right.$$

$$\left. (1-\alpha) * 10^{-1\left(ATT1 * \frac{TR}{20} + ATTN * \frac{x-TR}{20}\right)}\right]$$

$$Atop = A0 * 10^{-\left(ATT1 * \frac{TR}{20} + ATTN * \frac{x-TR}{20}\right)} *$$

$$\left[(1-\alpha) + \alpha * \frac{10^{-\left(ATTc1 * \frac{TR}{20} + ATTc2 * \frac{x-TR}{20}\right)}}{10^{-1\left(ATT1 * \frac{TR}{20} + ATTN * \frac{x-TR}{20}\right)}}\right]$$

$$Atop = A0 * 10^{-\left(ATT1 * \frac{TR}{20} + ATTN * \frac{x-TR}{20}\right)} *$$

$$\left[(1-\alpha) + \alpha * 10^{-\left[(ATTc1-ATT1)*\frac{TR}{20} + (ATTc2-ATTN)*\frac{x-TR}{20}\right]}\right]$$

Combining equations (3) and (4) the ratio of amplitudes between the top and the bottom of the considered sub-array spanning an interval between TR and x feet from the transmitter 48 becomes:

$$\frac{Atop}{Abot} = \frac{A0 * 10^{-\left(ATT1 * \frac{TR}{20} + ATTN * \frac{x-TR}{20}\right)} *}{A0 * 10^{-\left(ATT1 * \frac{Tr}{20}\right)}\left[(1-\alpha) + \alpha * 10^{-(ATTc1-ATT1)*\frac{TR}{20}}\right]} \quad (5)$$

$$\left[(1-\alpha) + \alpha * 10^{-\left[(ATTc1-ATT1)*\frac{TR}{20} + (ATTc2-ATTN)*\frac{x-TR}{20}\right]}\right]$$

$$\frac{Atop}{Abot} =$$

$$10^{-ATTN*\frac{x-TR}{20}} * \frac{(1-\alpha) + \alpha * 10^{-\left[(ATTc1-ATT1)*\frac{TR}{20} + (ATTc2-ATTN)*\frac{x-TR}{20}\right]}}{(1-\alpha) + \alpha * 10^{-(ATTc1-ATT1)*\frac{TR}{20}}}$$

Thus, the transmitter energy A0, one of the unknown of the system, has been effectively removed. The apparent attenuation is the logarithm of this ratio rescaled by the distance between the receiver 48 at position x and the bottom of the array of receivers 50:

$$AppATT = -\frac{20}{x - TR}\log\left(\frac{Atop}{Abot}\right) \quad (6)$$

And developing this with equation (5) we obtain:

$$AppATT = -\frac{20}{x - TR}\log\left(10^{-ATTN*\frac{x-TR}{20}} * \right. \quad (7)$$

$$\left. \frac{(1-\alpha) + \alpha * 10^{-\left[(ATTc1-ATT1)*\frac{TR}{20} + (ATTc2-ATTN)*\frac{x-TR}{20}\right]}}{(1-\alpha) + \alpha * 10^{-(ATTc1-ATT1)*\frac{TR}{20}}}\right)$$

$$AppATT = ATTN - \frac{20}{x - TR} *$$

-continued $$\log\left(\frac{(1-\alpha)+\alpha*10^{-\left[(ATTc1-ATT1)*\frac{TR}{20}+(ATTc2-ATTN)*\frac{x-TR}{20}\right]}}{(1-\alpha)+\alpha*10^{-(ATTc1-ATT1)*\frac{TR}{20}}}\right)$$

Therefore, the apparent attenuation is the real attenuation modified by a term that depends on the unknowns or parameters of the system (a, ATTc1, ATTc2, ATT1, and ATTN) except the amplitude of the transmitter:

$$\varphi = \tag{8}$$

$$-\frac{20}{x-TR}*\log\left(\frac{(1-a)+\alpha*10^{-\left[(ATTc1-ATT1)*\frac{TR}{20}+(ATTc2-ATTN)*\frac{x-TR}{20}\right]}}{(1-\alpha)+\alpha*10^{-(ATTc1-ATT1)*\frac{TR}{20}}}\right)$$

Figure 4:
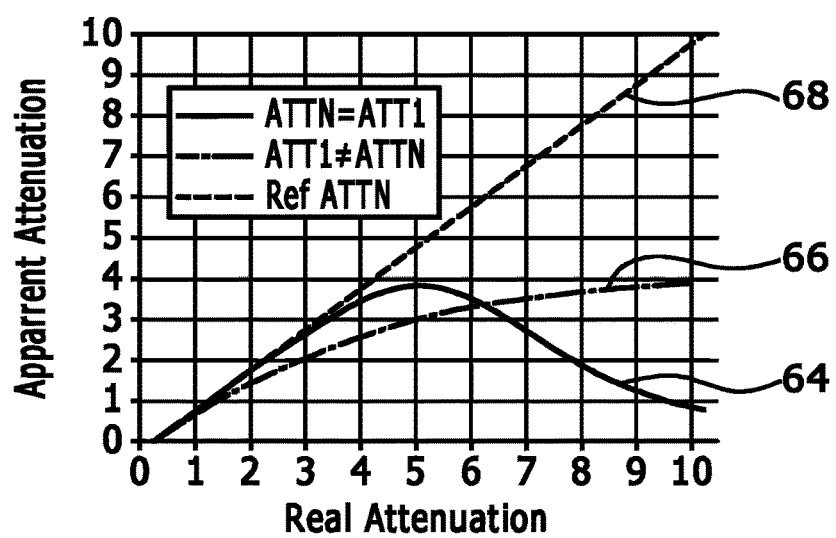
FIG. 4 is a graphical representation of an example showing apparent attenuation versus real attenuation with respect to the signals emitted and detected by the bond analysis tool, according to an embodiment of the disclosure.

This apparent attenuation vs. the real attenuation can be plotted to help understand the behavior of the equation (7). FIG. 4 illustrates the relationship between apparent attenuation and real attenuation of the casing 34. In this example, the plot uses α=10%, ATTc1=5 db/ft and ATTc2=0.5 db/ft for a spacing at first receiver TR=7 ft and to the last receiver at x=11 ft. The curve 64 corresponds to the case where the casing attenuation below the first receiver 50 is the same as along the receiver array (ATTN=ATT1). The bell shape behavior of the apparent attenuation signifies that a given apparent (or measured) attenuation could correspond to two values of casing attenuations. The curve 66 represents the case where ATTN is not equal to ATT1, which for this plot was taken as 6 dB/ft. In this example, a graph line 68 represents a reference ATTN.

While this situation does not seem favorable, the bell shape of the curve also indicates that the apparent attenuation has sensitivity to the casing attenuation although this sensitivity is now reversed. This sensitivity can be verified as identified with real data.

Figure 5:
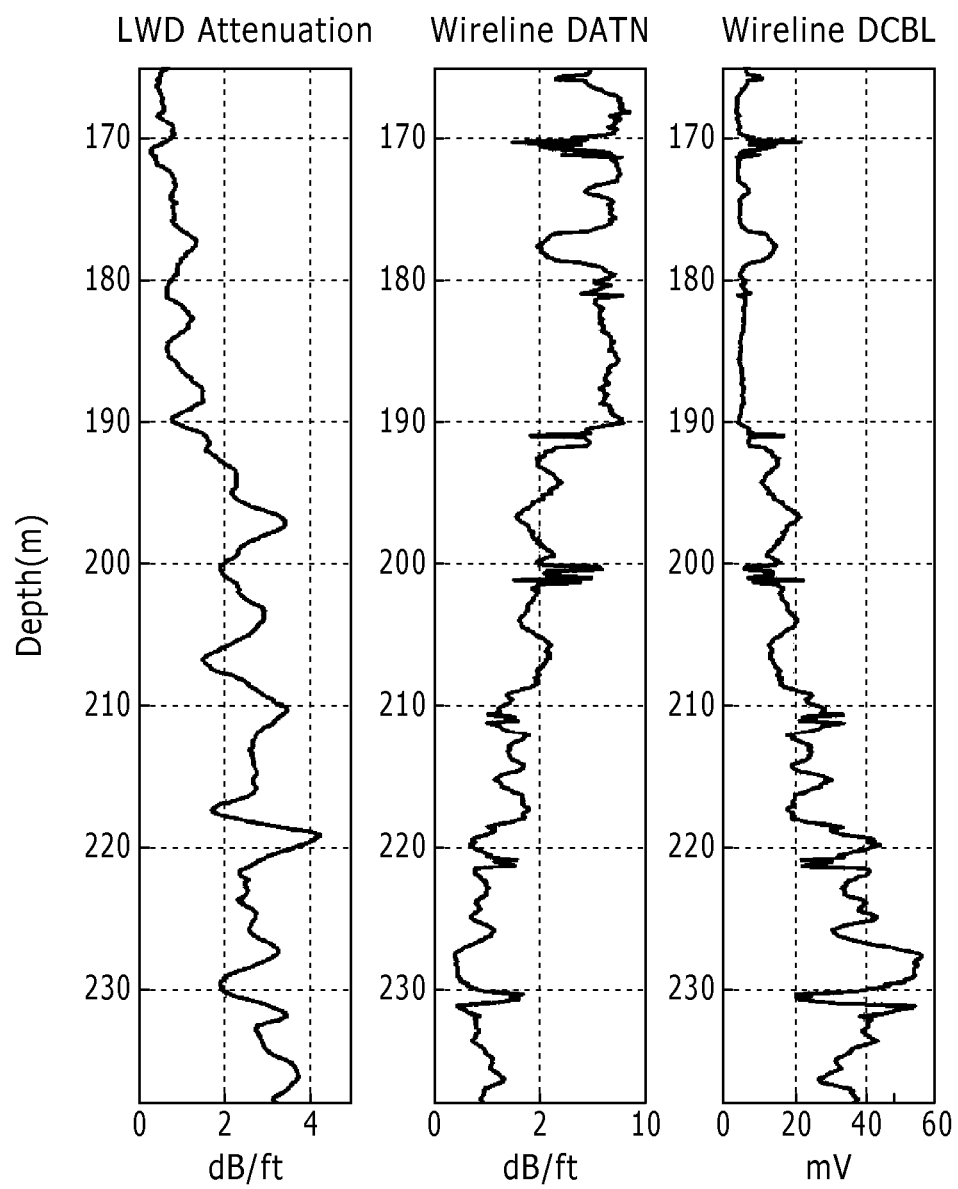
FIG. 5 is a graphical illustration of an example comparing wireline discriminated cement evaluation and logging-while-drilling cement evaluation, according to an embodiment of the disclosure.

The real data can be used to obtain an apparent attenuation. For comparison, in a cement evaluation procedure a wireline tool can be employed for providing discriminated attenuation (independent of transmitter power, receiver sensitivity and borehole fluid effects). The wireline tool can be run to provide a reference for comparison to the apparent attenuation log recorded with a logging-while-drilling (LWD) tool. An example of a comparison of obtained logs is displayed in FIG. 5.

Figure 6:
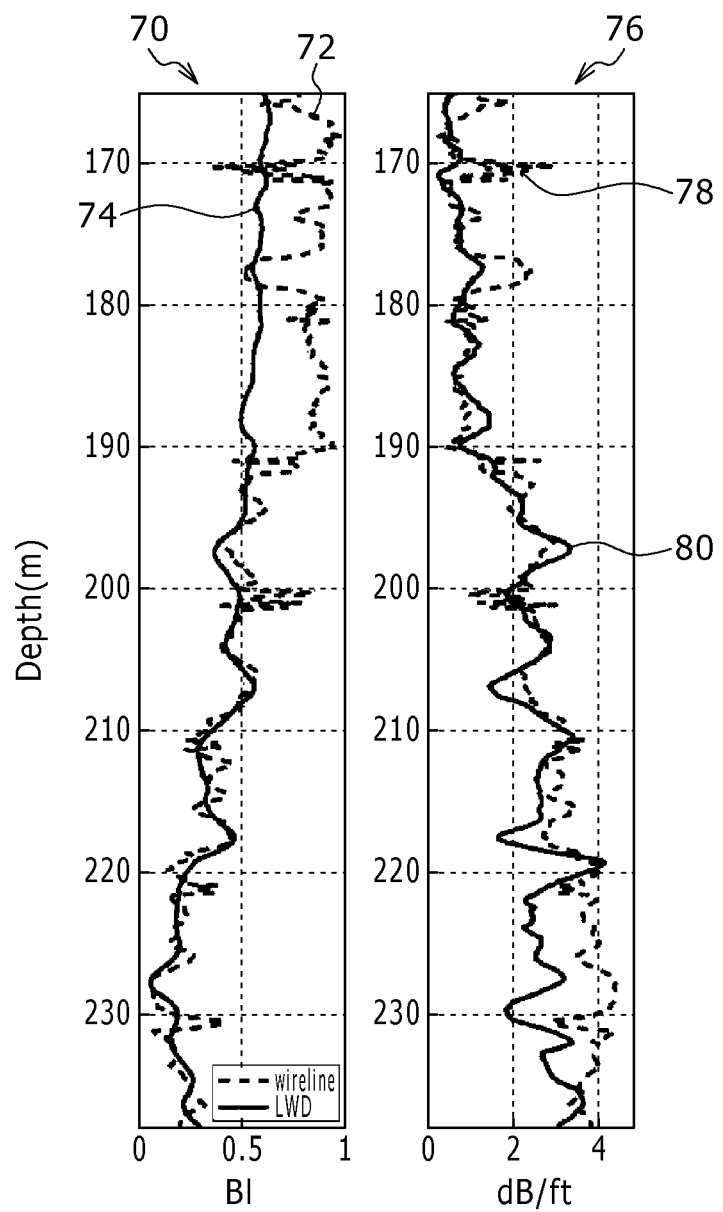
FIG. 6 is a graphical illustration of an example showing a superposition of the wireline discriminated attenuation and the logging-while-drilling apparent attenuation, according to an embodiment of the disclosure.

In FIG. 6, the left track 70 shows the comparison of the 2 Bond Index (BI) curves 72 from the wireline tool and the curve 74 from the LWD tool based on a conventional amplitude method. The right track 76 displays the discriminated attenuation curves 78 from the wireline tool with flipping and scaling superposed onto the LWD apparent attenuation curve 80.

This display confirms the finding that at high bond index values, e.g. above 210 m depth in the log described above, there is effectively reverse sensitivity of the apparent attenuation computed from the LWD tool to the real attenuation of the casing propagation. This display could also suggest that the amplitude approach may be used for low bond index values, while the attenuation approach might be used in high bonding situations where the amplitude approach is limited. A simple logic could be employed to switch from the amplitude approach to the attenuation approach at a given criterion. However, such scheme may not be feasible because the bell shape of the apparent attenuation vs. real attenuation shows that the apparent attenuation is generally different than the real attenuation. Therefore, a more sophisticated approach can be undertaken as described herein.

The apparent attenuation is larger than the real attenuation. To understand this phenomenon we refer back to the expression of apparent attenuation from equation (7):

$$AppATT = ATTN - \tag{7}$$

$$\frac{20}{x-TR}*\log\left(\frac{(1-\alpha)+\alpha*10^{-\left[(ATTc1-ATT1)*\frac{TR}{20}+(ATTc2-ATTN)*\frac{x-TR}{20}\right]}}{(1-\alpha)+\alpha*10^{-(ATTc1-ATT1)*\frac{TR}{20}}}\right)$$

For the apparent attenuation to be higher than the real attenuation of the casing 34 the logarithm factor is negative, hence its content is smaller than 1:

$$\frac{(1-\alpha)+\alpha*10^{-\left[(ATTc1-ATT1)*\frac{TR}{20}+(ATTc2-ATTN)*\frac{x-TR}{20}\right]}}{(1-\alpha)+\alpha*10^{-(ATTc1-ATT1)*\frac{TR}{20}}} < 1$$

$$(1-\alpha)+\alpha*10^{-\left[(ATTc1-ATT1)*\frac{TR}{20}+(ATTc2-ATTN)*\frac{x-TR}{20}\right]} <$$
$$(1-\alpha)+\alpha*10^{-(ATTc1-ATT1)*\frac{TR}{20}}$$

$$10^{-(ATTc1-ATT1)*\frac{TR}{20}}*10^{-(ATTc2-ATTN)\frac{x-TR}{20}} < 10^{-(ATTc1-ATT1)*\frac{TR}{20}}$$

$$10^{-(ATTc2-ATTN)\frac{x-TR}{20}} < 1$$

$$-(ATTc2-ATTN)\frac{x-TR}{20} < \log(1) = 0$$

$$ATTc2 - ATTN > 0$$

If the casing attenuation is less than the tool attenuation along the receiver array, then the apparent attenuation is higher than the real attenuation. This can occur in thin casings, light cements or a combination of the two.

The real attenuation data can be extracted when free pipe, e.g. free casing, is available. Now that the relationship has been established regarding the apparent attenuation between two receivers 50 and the real attenuation of the casing arrival employed for the bond index, a workflow is devised.

As seen in equation 5, reproduced below, that the ratio of amplitudes between a receiver 50 at a spacing x and the bottom of the array of receivers 50 removes the transmitter power.

$$\frac{Atop}{Abot} = \tag{5}$$

$$10^{-ATTN*\frac{x-TR}{20}}*\frac{(1-\alpha)+\alpha*10^{-\left[(ATTC1-ATT1)*\frac{TR}{20}+(ATTc2-ATTN)*\frac{x-TR}{20}\right]}}{(1-\alpha)+\alpha*10^{-(ATTc1-ATT1)*\frac{TR}{20}}}$$

If the attenuation rate in ATTc1 and ATTc2 is known, two unknowns remain in the system: the ratio of energy imparted to the tool 32 that is in the form of a drill collar and the casing 34 (with coefficient α) and the attenuation of the casing 34 below the first receiver 50, ATT1. When the tool 32 is in a free pipe section (free casing section), the casing attenuations are the same ATT1=ATTN=ATTfp, which is the free pipe attenuation of the casing 34.

Therefore, equations (3) and (4) can be rewritten as follows with certain parameters remaining unknown:

$$Abotfp = A0*10^{\left(-ATTfp*\frac{TR}{20}\right)}\left[(1-\alpha)+\alpha*10^{-(ATTc1-ATTfp)*\frac{TR}{20}}\right] \quad (3fp)$$

$$Atopfp = A0*10^{-\left(ATTfp*\frac{TR}{20}+ATTN*\frac{x-TR}{20}\right)}*$$
$$\left[(1-\alpha)+\alpha*10^{-\left[(ATTC1-ATTfp)*\frac{TR}{20}+(ATTc2-ATTfp)*\frac{x-TR}{20}\right]}\right]$$

$$Atopfp = \quad (4fp)$$
$$A0*10^{-\left(ATTfp*\frac{x}{20}\right)}*\left[(1-\alpha)+\alpha*10^{-\left[ATTc1\frac{TR}{20}+ATTc2\frac{x-TR}{20}-ATTfp\frac{x}{20}\right]}\right]$$

The ratio of the two becomes:

$$\frac{Atopfp}{Abotfp}=10^{-ATTfp*\frac{x-TR}{20}}*\frac{(1-\alpha)+\alpha*10^{-\left[ATTc1\frac{TR}{20}+ATTc2\frac{x-TR}{20}-ATTfp\frac{x}{20}\right]}}{(1-\alpha)+\alpha*10^{-(ATTc1-ATTfp)*\frac{TR}{20}}} \quad (9)$$

In this equation a single unknown remains, namely the factor $\alpha$ that can be computed to provide the percentage of A0 amplitude that goes into the collar. Once we know $\alpha$, the effective amplitude A0 from Equations (3fp) or (4fp) can be computed. Once $\alpha$ and A0 are known, ATT1 can be computed for each desired point in the well from Equation (3):

$$Abot = A0*10^{\left(-ATT1*\frac{TR}{20}\right)}\left[(1-\alpha)+\alpha*10^{-(ATTc1-ATT1)*\frac{TR}{20}}\right]$$

and the attenuation ATTN in front of the receiver array from Equation (4):

$$Atop = A0*10^{-\left(ATT1*\frac{TR}{20}+ATTN*\frac{x-TR}{20}\right)}*$$
$$\left[(1-\alpha)+\alpha*10^{-\left[(ATTc1-ATT1)*\frac{TR}{20}+(ATTc2-ATTN)*\frac{x-TR}{20}\right]}\right]$$

The quantitative bond index can then be computed from the ATTN value.

ATT1 and ATTN are both casing attenuations, but they have different vertical resolutions as the former covers from the transmitter 48 to the receiver 50 and the second one spans from the bottom of the array to the receiver at spacing x. A two-passes process enables verification of the two answers by superposing the higher resolution ATTN window averaged over the distance TR, to match the vertical resolution of ATT1. This method uses a free pipe section but also assumes that $\alpha$ and A0 are constant in the well which might not be true for long intervals or changing borehole fluid conditions.

A methodology is therefore established to address when no free pipe is available or when we do not want to make any assumption on the invariance of $\alpha$ and A0. Additionally, the real attenuation data may be extracted without free pipe calibration. The sonic amplitude without collar propagation is equal to:

$$Amp(x) = A0*10^{-\left(ATT1*\frac{TR}{20}+ATTN*\frac{x-TR}{20}\right)}$$

The logarithm of this amplitude, or magnitude, becomes:

$$\log(Amp(x)) = \log(A0) - ATT1*\frac{TR}{20} - ATTN*\frac{x-TR}{20}$$

Or $$\log(Amp(x)) = A1 - ATTN*\frac{x-TR}{20}$$

where A1 is a value that encompasses the propagation effects below the bottom receiver. It is a constant for each spacing x. Therefore, the magnitude of the signal is linearly related to the casing attenuation for the entire group of receivers 50 across the array.

When collar propagation is present in the measurement, the sonic amplitude at a spacing x from the transmitter 48 is equal to:

$$Amp(x) = A0* \quad (11)$$
$$\left(\alpha*10^{-\left(ATTc1*\frac{TR}{20}+ATTc2*\frac{x-TR}{20}\right)}+(1-\alpha)10^{-\left(ATTN1*\frac{TR}{20}+ATTN*\frac{x-TR}{20}\right)}\right)$$

Figure 7:
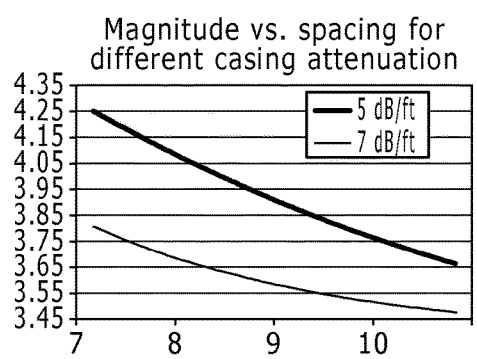
FIG. 7 is a graphical illustration of an example comparing behavior of a signal magnitude versus spacing when a collar arrival is present, according to an embodiment of the disclosure.

With respect to the behavior of this signal it departs from the linear relationship to casing attenuation. Referring to the graph illustrated in FIG. 7, a plot is provided which displays this behavior for an arbitrary A0 and TR=7 ft, ATTc1=5 dB/ft, ATTc2=0.5 dB/ft, and ATT1=ATTN=7 dB/ft.

As expected, the magnitude of the sum of collar and casing arrival is not linearly related to receiver spacing. Different casing attenuation rates yield different curvatures of the magnitude. A solution to Equation (11) comprises approximating the behavior of the magnitude curve by using the individual attenuations rates present between the various receivers 50 of the array.

Figure 8:
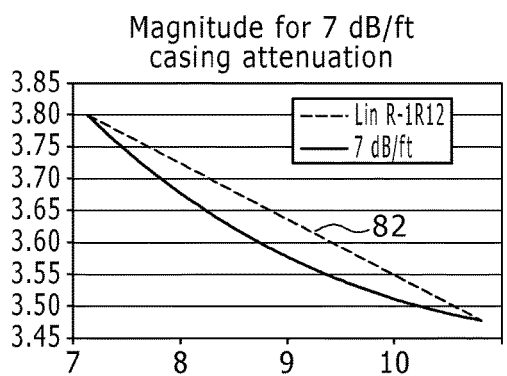
FIG. 8 is a graphical illustration of an example showing an approach to approximating a curve along a graph of magnitude versus spacing, according to an embodiment of the disclosure.
Figure 9:
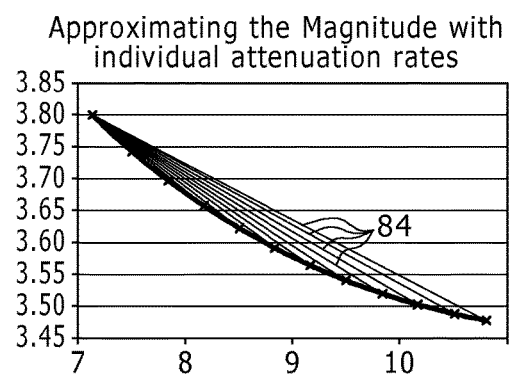
FIG. 9 is a graphical illustration of an example showing another approach to approximating a curve along a graph of magnitude versus spacing, according to an embodiment of the disclosure.

Referring generally to the graph illustrated in FIG. 8, a plot provides an example for the 7 dB/ft casing attenuation where the departure from linearity is shown by the straight line 82 joining the magnitude at the first and last receiver 50 of the array. This straight line 82 has a physical meaning: it is the apparent attenuation rate computed using these two receivers 50. In the graph provided in FIG. 9, a plot illustrates a plurality, e.g. 11, linear relationships (represented by lines 84) between the magnitude of the signal at the first receiver 50 and the other receivers 50 of the array. These lines 84 correspond to the individual attenuation rates of the pairs of receivers 50, e.g. the 11 pairs of receivers in this example. As the curvature of the magnitude curve vs. spacing increases, so does the change of attenuation rates computed from consecutive pairs. It is therefore possible to obtain the curvature of the magnitude curve by computing the multiple apparent attenuation rates obtained from the pairs of receivers 50 in the array.

This concept may be expressed mathematically via mathematical formulation as follows. For a receiver 50 at distance x from the transmitter 48 and another receiver 50 at distance x+Δ, the amplitude from the latter is related to the amplitude of the former by the following formula:

$$Amp(x+\Delta) = Amp(x)*10^{-AppATT(x,\Delta)*\frac{\Delta}{20}}$$

Therefore, the apparent attenuation between distances x and x+Δ is:

$$AppATT(x, \Delta) = -\frac{20}{\Delta}\log\left(\frac{Amp(x+\Delta)}{Amp(x)}\right)$$

The amplitude at the first receiver 50, located at distance TR from the transmitter 48, is the sum of the collar and casing propagations:

Amp(TR)=AmpCol(TR)AmpCas(TR)

Between the distance TR and the distance x from the transmitter 48, the collar signal is attenuated by the collar attenuation ATTc2, while the casing component is attenuated by the attenuation ATTN:

$$Amp(x) = AmpCol(TR)*10^{-ATTc2\frac{x-TR}{20}} + AmpCas(TR)*10^{-ATTN\frac{x-TR}{20}} \quad (12)$$

Similarly, between TR and x+Δ, the collar signal is attenuated by the collar attenuation ATTc2, while the casing component is attenuated by the attenuation ATTN:

$$Amp(x+\Delta) =$$

$$AmpCol(TR)*10^{-ATTc2\frac{x-TR+\Delta}{20}} + AmpCas(TR)*10^{-ATTN\frac{x-TR+\Delta}{20}}$$

Therefore, the ratio of amplitudes between spacing x and x+Δ is:

$$\frac{Amp(x+\Delta)}{Amp(x)} =$$

$$\frac{AmpCol(TR)*10^{-ATTc2\frac{x-TR+\Delta}{20}} + AmpCas(TR)*10^{-ATTN\frac{x-TR+\Delta}{20}}}{AmpCol(TR)*10^{-ATTc2\frac{x-TR}{20}} + AmpCas(TR)*10^{-ATTN\frac{x-TR}{20}}}$$

If we now consider two different receivers 50 at two spacings, Δ1 and Δ2 from a reference receiver at distance x their respective amplitude ratios to the reference receiver are:

$$\frac{Amp(x+\Delta 1)}{Amp(x)} =$$

$$\frac{AmpCol(TR)*10^{-ATTc2\frac{x-TR+\Delta 1}{20}} + AmpCas(TR)*10^{-ATTN\frac{x-TR+\Delta 1}{20}}}{AmpCol(TR)*10^{-ATTc2\frac{x-TR}{20}} + AmpCas(TR)*10^{-ATTN\frac{x-TR}{20}}}$$

$$\frac{Amp(x+\Delta 2)}{Amp(x)} =$$

$$\frac{AmpCol(TR)*10^{-ATTc2\frac{x-TR+\Delta 2}{20}} + AmpCas(TR)*10^{-ATTN\frac{x-TR+\Delta 2}{20}}}{AmpCol(TR)*10^{-ATTc2\frac{x-TR}{20}} + AmpCas(TR)*10^{-ATTN\frac{x-TR}{20}}}$$

And the ratio of the two above equations gives:

$$\frac{Amp(x+\Delta 2)}{Amp(x+\Delta 1)} =$$

$$\frac{AmpCol(TR)*10^{-ATTc2\frac{x-TR+\Delta 2}{20}} + AmpCas(TR)*10^{-ATTN\frac{x-TR+\Delta 2}{20}}}{AmpCol(TR)*10^{-ATTc2\frac{x-TR+\Delta 1}{20}} + AmpCas(TR)*10^{-ATTN\frac{x-TR+\Delta 1}{20}}}$$

This can be rewritten in a more convenient form:

$$\frac{Amp(x+\Delta 2)}{Amp(x+\Delta 1)} = \frac{\frac{AmpCol(TR)}{AmpCas(TR)}*10^{-ATTc2\frac{x-TR+\Delta 2}{20}} + 10^{-ATTN\frac{x-TR+\Delta 2}{20}}}{\frac{AmpCol(TR)}{AmpCas(TR)}*10^{-ATTc2\frac{x-TR+\Delta 1}{20}} + 10^{-ATTN\frac{x-TR+\Delta 1}{20}}}$$

This formulation effectively removes the transmitter amplitude A0. The formulation also combines the ratio α of effective amplitude imparted at the transmitter 48 to the tool 32 that is in the form of a drill collar and casing 34, and the casing attenuation below the receiver array, ATT1, with one unknown, the ratio:

$$R = \frac{AmpCol(TR)}{AmpCas(TR)}$$

of the drill collar to the casing signal amplitude at the first receiver, which is common to all the possible pair of receivers in the array. The formulation becomes:

$$\frac{Amp(x+\Delta 2)}{Amp(x+\Delta 1)} = \frac{R*10^{-ATTc2\frac{x-TR+\Delta 2}{20}} + 10^{-ATTN\frac{x-TR+\Delta 2}{20}}}{R*10^{-ATTc2\frac{x-TR+\Delta 1}{20}} + 10^{-ATTN\frac{x-TR+\Delta 1}{20}}} \quad (13)$$

$$\frac{Amp(x+\Delta 2)}{Amp(x+\Delta 1)} = \frac{10^{-ATTc2\frac{x-TR+\Delta 2}{20}}}{10^{-ATTc2\frac{x-TR+\Delta 1}{20}}} * \frac{R + 10^{(ATTc2-ATTN)\frac{x-TR+\Delta 2}{20}}}{R + 10^{(ATTc2-ATTN)\frac{x-TR+\Delta 1}{20}}}$$

$$\frac{Amp(x+\Delta 2)}{Amp(x+\Delta 1)} = 10^{-ATTc2\frac{\Delta 2-\Delta 1}{20}} * \frac{R + 10^{(ATTc2-ATTN)\frac{x-TR+\Delta 2}{20}}}{R + 10^{(ATTc2-ATTN)\frac{x-TR+\Delta 1}{20}}}$$

If we call the known quantity:

$$\beta(\Delta 1, \Delta 2) = 10^{-ATTc2\frac{\Delta 2-\Delta 1}{20}} \text{ and } \gamma(\Delta 1, \Delta 2)$$

the ratio of amplitude measurements between receivers at x+Δ2 and x+Δ1 is $$(\Delta 1, \Delta 2) = \frac{Amp(x+\Delta 2)}{Amp(x+\Delta 1)},$$

and the above equation becomes as follows (with γ(Δ1, Δ2) rewritten as γ, and β(Δ1, Δ2) as β to improve readability):

$$\gamma = \beta * \frac{R + 10^{(ATTc2-ATTN)\frac{x-TR+\Delta 2}{20}}}{R + 10^{(ATTc2-ATTN)\frac{x-TR+\Delta 1}{20}}} \quad (14)$$

Or $$\gamma*(R + 10^{(ATTc2-ATTN)\frac{x-TR+\Delta 1}{20}}) -$$

$$\beta*(R + 10^{(ATTc2-ATTN)\frac{x-TR+\Delta 2}{20}}) = 0$$

-continued $$\gamma * R + \gamma * 10^{(ATTc2-ATTN)\frac{x-TR+\Delta 1}{20}} - \beta * R -$$

$$\beta * R * 10^{(ATTc2-ATTN)\frac{x-TR+\Delta 2}{20}} = 0$$

$$R*(\gamma-\beta)*10^{(ATTc2-ATTN)\frac{x-TR+\Delta 1}{20}} - \beta * 10^{(ATTc2-ATTN)\frac{x-TR+\Delta 2}{20}} = 0$$

$$R + \frac{\gamma}{\gamma-\beta}*10^{(ATTc2-ATTN)\frac{x-TR+\Delta 1}{20}} -$$

$$\frac{\beta}{\gamma-\beta}*10^{(ATTc2-ATTN)\frac{x-TR+\Delta 2}{20}} = 0$$

The two unknowns in this equation are the casing attenuation in front of the receiver array, ATTN, used for the quantitative bond index answer and the ratio of collar to casing amplitude at the bottom receiver R.

With, for example, a tool featuring 12 receivers, there are $A_2^{12}$ different combinations of x, $\Delta 1$ and $\Delta 2$ providing 220 equations of the above form that can be used to extract the two unknowns in this formulation. However, it also is useful to understand the physical meaning of this new formulation. Taking the logarithm of both sides of Equation 13 we obtain:

$$\log\left(\frac{Amp(x+\Delta 2)}{Amp(x+\Delta 1)}\right) = -ATTc2\frac{\Delta 2-\Delta 1}{20} +$$

$$\log\left(\frac{R+10^{(ATTc2-ATTN)\frac{x-TR+\Delta 2}{20}}}{R+10^{(ATTc2-ATTN)\frac{x-TR+\Delta 1}{20}}}\right) - \frac{20}{\Delta 2-\Delta 1}\log\left(\frac{Amp(x+\Delta 2)}{Amp(x+\Delta 1)}\right) =$$

$$ATTc2 - \frac{20}{\Delta 2-\Delta 1}\log\left(\frac{R+10^{(ATTc2-ATTN)\frac{x-TR+\Delta 2}{20}}}{R+10^{(ATTc2-ATTN)\frac{x-TR+\Delta 1}{20}}}\right)$$

Remembering that the left side of this equation is the attenuation between $x+\Delta 1$ and $x+\Delta 2$, AppAtt(x, $\Delta 1$, $\Delta 2$) we get:

$$AppAtt(x, \Delta 1, \Delta 2) = ATTc2 - \frac{20}{\Delta 2-\Delta 1}\log\left(\frac{R+10^{(ATTc2-ATTN)\frac{x-TR+\Delta 2}{20}}}{R+10^{(ATTc2-ATTN)\frac{x-TR+\Delta 1}{20}}}\right)$$

Thus, the apparent attenuation between two receivers 50 in the array is equal to the attenuation in the receiver section of the tool 32 that is in the form of the drill collar, modified by a term that depends on the attenuation of the casing 34, ATTN, and the ratio R of the drill collar to the casing signal at the first receiver.

Individual apparent attenuation behavior may be verified. Using equation (11) in an example, the sum of the amplitude of the casing and collar signals has been computed for a tool 32 featuring 12 stations/receivers spaced from 7 ft to 10 ft featuring an attenuation rate of 5 dB/ft between the transmitter 48 and the first receiver 50 and 0.5 dB/ft attenuation along the receiver section. The relative percentage of the effective amplitude travelling inside the collar, α, the casing attenuation below the first receiver, ATT1, and in front of the receiver section, ATTN, was varied to investigate the change in the individual apparent attenuation.

Figure 10:
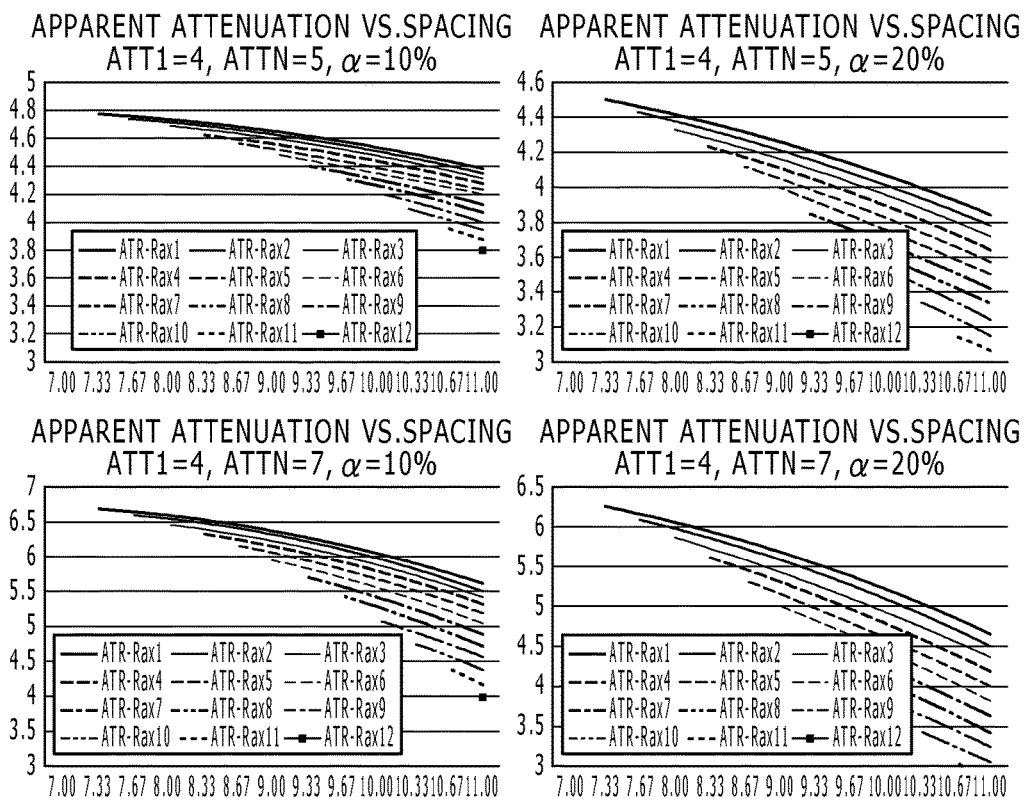
FIG. 10 is a graphical illustration of an example in which a series of graphs are provided to show individual apparent attenuation resulting from a variation of parameters, according to an embodiment of the disclosure.

FIG. 10 provides a series of plots illustrating apparent attenuation versus spacing. For example, FIG. 10 illustrates the reference computations in the top left plot and variations of the parameters in the other three plots. Each illustrated curve shows the individual attenuation for the individual receiver pairs versus the last receiver spacing. The reference graph illustrates an example in which ATTN=5 dB/ft, ATT1=4 dB/ft and α=10%. In this example, the value of α has been increased to 20% in the top right plot, while the two bottom graphs display the apparent attenuation for ATTN=7 dB/ft for α of 10% and 20%.

As illustrated, the differences between individual attenuations range from 3.8 to 4.8 dB/ft in the reference case and extend to a 4 to 6 dB/ft range when the casing attenuation increases from 5 to 7 dB. This observation shows that when the casing attenuation increases, i.e. when the amplitude-based method becomes less and less valid, the sensitivity of individual apparent attenuations to the casing attenuation increases. Such result is expected as the curvature of the magnitude vs. spacing relationship increases. As illustrated by the left and right plots the range of apparent attenuations increases with α, the amount of transmitter energy imparted to the collar. This demonstrates that the apparent attenuation sensitivity increases with the amount of collar arrival, or when the amplitude-based approach is deteriorating.

These results show that an inversion of the apparent attenuations from Equation (14) is possible so as to obtain the casing attenuation. According to an embodiment of the methodology, an inversion may thus be performed. As input to these equations, the amplitudes at spacing $x+\Delta 1$ and $x+\Delta 2$ might be affected by road noise, measurement errors, and other pre-processing errors. And, because the attenuation ATTN might not be perfectly constant over the array length, the 220 individual equations can be re-written as follows where the function δ(x, $\Delta 1$, $\Delta 2$) combines all these errors:

$$R + \frac{\gamma}{\gamma-\beta}*10^{(ATTc2-ATTN)\frac{x-TR+\Delta 1}{20}} - \qquad (15)$$

$$\frac{\beta}{\gamma-\beta}*10^{(ATTc2-ATTN)\frac{x-TR+\Delta 2}{20}} = \delta(x, \Delta 1, \Delta 2)$$

The best fit of the two unknowns in this system, R and ATTN, can be assessed with the sum of the squares of the function δ defined above for the 220 possible cases:

$$\varepsilon = \sqrt{\sum_1^{220}\delta(x, \Delta 1, \Delta 2)^2} .$$

An iterative approach may be applied as follows. The Equation (15) to minimize is composed of a constant, the ratio R, and two components following an exponential decay depending on the second unknown, the casing attenuation ATTN. Therefore, an iterative approach can be taken where the incoherence function E can be computed for an arbitrary value of R and a series of values for ATTN. The most likely solution ATTN is the one that gives the lower value of δ, δmin(R). The most likely solution R is the one that gives the minimum value of E for that value of ATTN.

Figure 11:
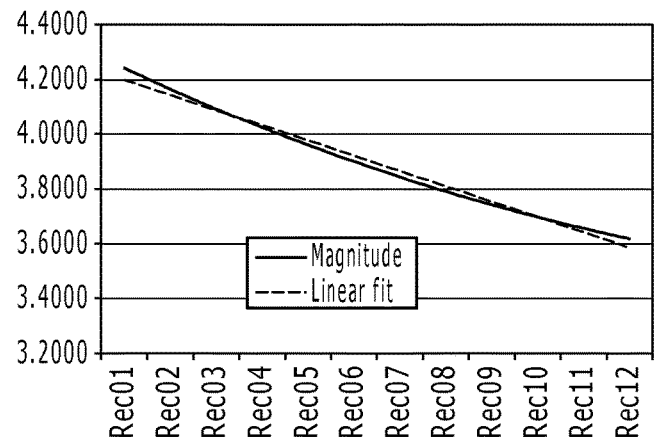
FIG. 11 is a graphical illustration of an example showing magnitude versus spacing for model parameters, according to an embodiment of the disclosure.

Based on testing of this algorithm, an example is provided having the following parameters: TR=7 ft, α=20%, ATTc1=5 dB/ft, ATTc2=0.5 dB/ft, ATT1=5 dB/ft and ATTN=5.7 dB/ft. This set of parameters gives a value R of collar to casing amplitude at the first receiver 50 equal to R=0.25. The algorithm may effectively be bootstrapped with a value of R equal to 1. The magnitude versus spacing plot is illustrated by the graph in FIG. 11.

Figure 12:
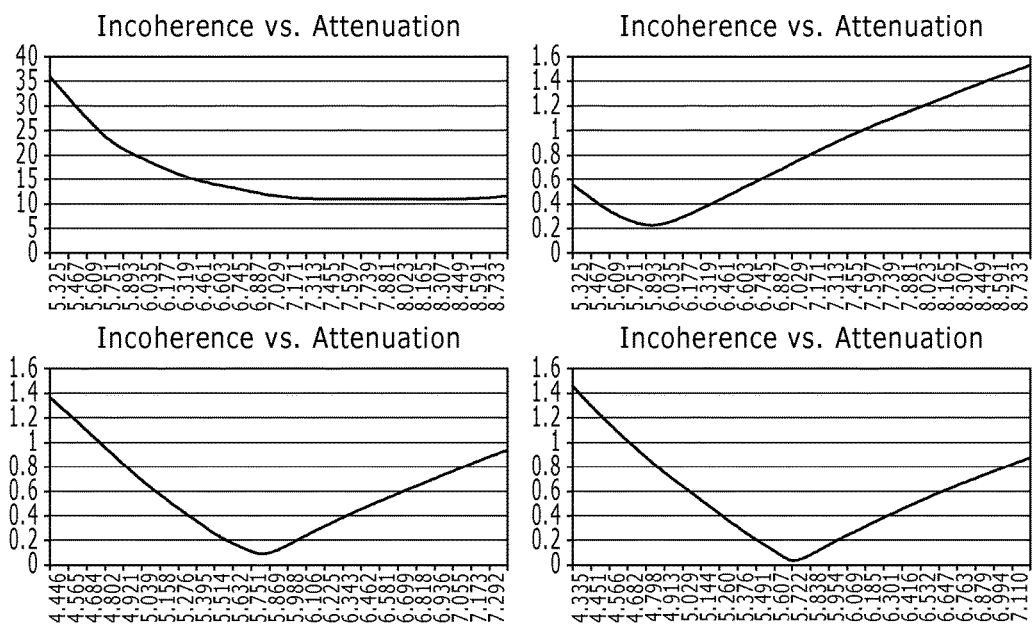
FIG. 12 is a graphical illustration of an example in which a series of graphs is provided to show iterative algorithm results for individual iterations, according to an embodiment of the disclosure.

Referring generally to FIG. 12, a series of graphs is provided to show four iterations of this algorithm that converge to R=0.2524 and ATTN=5.72 dB/ft, respectively, 0.04% lower and 0.39% higher than the model input. While this approach is very efficient in the absence of noise, it might not behave as well with degraded signal-to-noise ratio and risks locking on a local minimum. A second, robust approach also may be employed.

The second approach employs a two parameters inversion. To prevent locking on local minima, a two parameter inversion algorithm is computed for a series of R values and ATTN with the incoherence ε. The inversion algorithm is applied iteratively with a focus on the global minimum found at each stage with a finer reduced range of R and ATTN. The iterative process is applied until the change of those values between iterations is less than a preset level.

Figure 13:
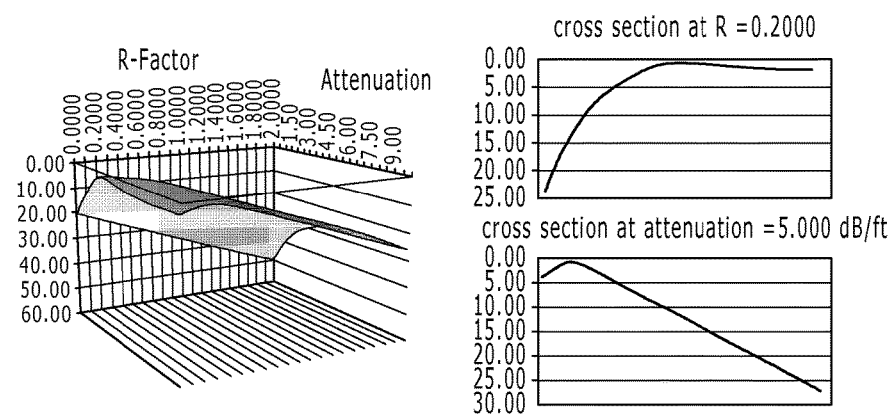
FIG. 13 is a graphical illustration of an example of a first iteration of a two-parameter inversion map, according to an embodiment of the disclosure.
Figure 14:
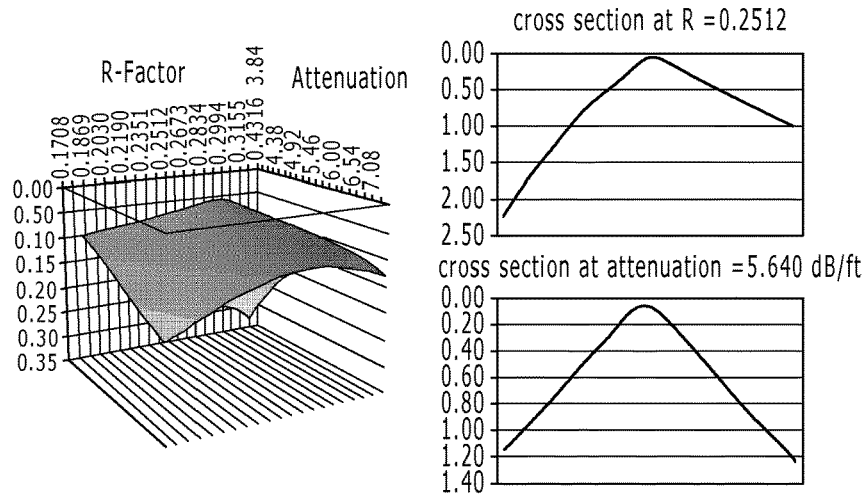
FIG. 14 is a graphical illustration of an example of a third iteration of a two-parameter inversion map, according to an embodiment of the disclosure.
Figure 15:
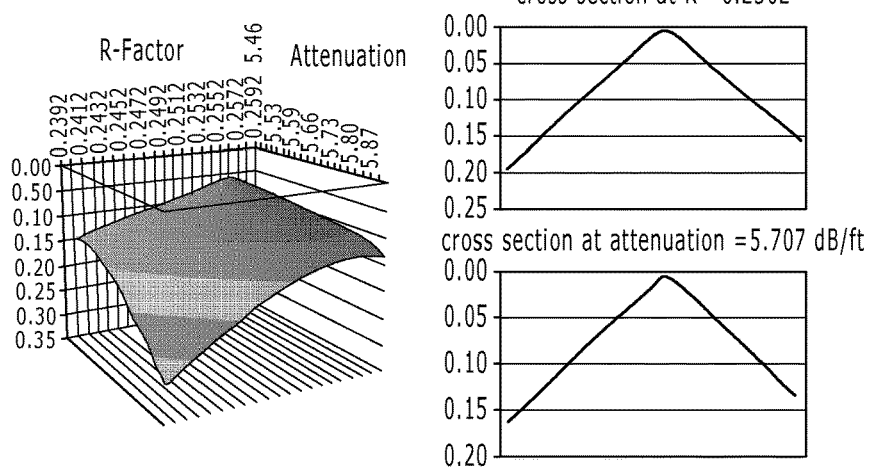
FIG. 15 is a graphical illustration of an example of a sixth iteration of a two-parameter inversion map, according to an embodiment of the disclosure.

With the same parameters as in the previous paragraph the original grid spans 0 to 10 dB/ft attenuation and 0 to 2 for R. The incoherence map of ε is shown in FIG. 13 in 3D on the left (vertical axis is ε) and the cross-sections of this map for the most likely ATTN and R values are shown on the right side of FIG. 13. FIGS. 14 and 15 illustrate the inversion incoherence map after the third and sixth iterations, respectively. These latter iterations give ATTN=5.71 dB/ft and R=0.2502 which are respectively 0.13% smaller and 0.07% larger than the model input. In this example, the eighth iteration converges within 0.02% of the input values.

Figure 16:
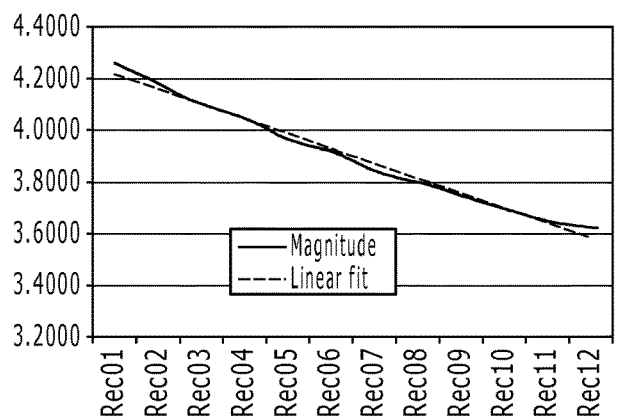
FIG. 16 is a graphical illustration of an example showing magnitude versus spacing for a 20 dB signal to (white) noise ratio, according to an embodiment of the disclosure.

The system and methodology described herein also provide substantial improvement with respect to sensitivity to noise. The two algorithms described in the previous paragraphs were tested with various levels of white noise applied to the individual receiver amplitude measurements. The results showed attenuation values within 10% of the model input for signal to noise ratio down to 20 dB. For reference, an example of magnitude vs. spacing for such a case is displayed in FIG. 16.

As described herein, the methodology uses the attenuation of the acoustic signal across an array of receivers 50 from a sonic tool log of the tool 32 that is in the form a drill collar in a cased hole to infer the attenuation of the casing 34 so as to compute a quantitative bond index. The method does not try to separate the signal traveling inside the drill collar from the signal traveling inside the casing 34 but processes the two signals jointly to provide the attenuation of the latter using the attenuation of the acoustic propagation in the tool 32, which is known for a sonic tool with predictable acoustics.

It should be noted further that embodiments of the present methodology may be employed for extracting a parameter with respect to the amplitude of the sonic signal using a spectral method. Examples of spectral methods include Fourier Transformation and Wavelet Transformation for a waveform. For example, the energy of a given waveform may be extracted from a frequency domain via processing a Fourier or Hilbert representation of the acoustic signal. In an example, the square root of the energy may be used to provide a measurement which represents the sum of the amplitude of the signals of interest for a quantitative bond index using the attenuation approach described herein. This method enables extraction of the pseudo-amplitude measurement from the spectrum over the frequency most suitable for quantitative bond index commutation, that is the band over which the attenuator of the logging-while-drilling tool 51 has a high degree of efficiency.

However, converting the waveform to the frequency domain may involve losses with respect to the time information of the waveform which would be useful in capturing the impact of the casing and collar signals present at the beginning of a wave train. A pre-processing in the time domain may therefore be used to isolate the signals of interest before conversion to the time domain. Furthermore, a Hanning window around the arrivals of interest zeroing the window waveforms before the first zero crossing and after the last zero crossing of the targeted time window may be used as a suitable isolation method.

A Wavelet Transformation methodology may be used to combine the robustness of the total energy from semblance with the benefits of the spectral method using Fourier or Hilbert transforms but without the aspects associated with the time isolation during a pre-processing. This computational approach provides a correlogram of the input waveforms with the functions of the wavelet base whose amplitude represents the energy and given times of the waveform and for various frequencies investigated by the wavelet-based functions. In this example, the part of the correlogram which encompasses the sum of casing and collar signals for each waveform of the array of receivers 50 can be isolated by a mask covering the expected time of arrival and the duration of both signals moving across the array of receivers with the expected slowness of these arrivals. A square root of correlogram value in the selected time and frequency mask can be directly used as a representative value of the amplitude of the sum of the collar encasing signal. This, in turn, can be used to feed the attenuation analysis for quantitative bond index computation as described above.

In general, structures and functionality presented as separate components in the embodiments described above may be implemented as combined structure or combined components. Similarly, structures and functionality presented as a single component may be implemented as separate components. These and other variations, modifications, additions, and improvements may fall within the scope of the disclosed subject matter. It should be further noted that the embodiments described herein and the parameter values used in discussing those embodiments are provided as examples to enhance the understanding of the reader and should not be construed as limiting.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of evaluating bonding of cement in a wellbore, comprising:
  providing, as a drill collar that is part of a drill string, a bond analysis tool with a transmitter and a plurality of receivers;
  delivering the bond analysis tool downhole along an interior of a pipe having pipe sections;
  emitting sonic signals via the transmitter for propagation along the pipe until received by the plurality of receivers;
  processing an amplitude of a received combination of propagating sonic signals inside the drill collar and inside the pipe, wherein the propagating sonic signals comprise a combination of a propagating drill collar signal and a propagating pipe signal;
  computing an apparent attenuation of the propagating sonic signals, wherein a range of apparent attenuations increases with amount of transmitter signal energy imparted to the drill collar as the propagating drill collar signal; and
  using the apparent attenuation between various pairs of receivers of the plurality of receivers as being dependent on a ratio of the propagating drill collar signal to the propagating pipe signal and attenuation in a receiver section of the drill collar to extract the attenuation in the pipe for evaluation of bonding between the pipe and a surrounding cement.

2. The method as recited in claim 1, wherein computing comprises extracting a parameter related to the amplitude of the sonic signals via a spectral method.

3. The method as recited in claim 1, wherein computing comprises extracting a parameter related to the amplitude of the sonic signals via a Fourier transformation.

4. The method as recited in claim 1, wherein computing comprises extracting a parameter related to the amplitude of the sonic signals via a wavelet transformation.

5. The method as recited in claim 1, further comprising providing a quantitative bond index up to 100% between the pipe and the cement along a desired length of the pipe.

6. The method as recited in claim 1, wherein providing comprises providing the bond analysis tool in the form of a logging-while-drilling tool.

7. The method as recited in claim 1, wherein delivering comprises delivering the bond analysis tool along an interior of well casing.

8. The method as recited in claim 1, further comprising forming the plurality of receivers into an array of at least 10 receivers.

9. A method, comprising:
   providing, as a drill collar that is part of a drill string, a bond analysis tool with a transmitter and a plurality of receivers;
   delivering the bond analysis tool into a pipe and emitting a signal via the transmitter;
   processing an amplitude of a combination of propagating signals resulting from the signal emitted by the transmitter and received by the plurality of receivers;
   computing an apparent attenuation of the propagating signals, wherein the propagating signals comprise a combination of a propagating drill collar signal and a propagating pipe signal and wherein a range of apparent attenuations increases with amount of transmitter signal energy imparted to the drill collar as the propagating drill collar signal;
   employing the apparent attenuation between various pairs of receivers of the plurality of receivers, as being dependent on a ratio of the propagating drill collar signal to the propagating pipe signal and attenuation in a receiver section of the drill collar, to extract the attenuation in the pipe; and
   using the attenuation in the pipe to determine whether sections of the pipe are free or constrained.

10. The method as recited in claim 9, wherein providing comprises providing the bond analysis tool in the form of a logging-while-drilling tool.

11. The method as recited in claim 10, wherein positioning the bond analysis tool comprises positioning the bond analysis tool in a casing located in a borehole.

12. The method as recited in claim 10, wherein positioning the bond analysis tool comprises conveying the bond analysis tool downhole with the drill string during a drilling operation and locating the bond analysis tool in the pipe wherein the pipe is a casing positioned in a borehole and surrounded by cement.

13. The method as recited in claim 12, wherein using comprises determining a quantitative bond index between the casing and the cement.

14. The method as recited in claim 9, wherein employing comprises extracting a parameter related to the amplitude of the sonic signals via a spectral method.

15. The method as recited in claim 12, further comprising forming the plurality of receivers into an array of at least 10 receivers.

16. The method as recited in claim 15, further comprising coupling the bond analysis tool with a control system positioned at a surface location.

17. A system, comprising:
   a wellbore lined with a casing and cement located along an exterior of the casing;
   a logging-while-drilling tool that is in the form of a drill collar that is deployable as part of a drill string into the casing via a conveyance, the logging-while-drilling tool having a transmitter to provide a sonic signal and a plurality of receivers position to receive combinations of propagating signals resulting from the sonic signal; and
   a processor-based control system coupled with the logging-while-drilling tool to process amplitudes of the combinations of propagating signals, to compute an apparent attenuation of the propagating signals, and to determine the apparent attenuation between various pairs of receivers of the plurality of receivers to extract the attenuation in the casing, as being dependent on a ratio of a propagating drill collar signal to a propagating casing signal and attenuation in a receiver section of the drill collar, for evaluation of bonding between the casing and the cement, wherein a range of apparent attenuations increases with amount of transmitter sonic signal energy imparted to the drill collar as the propagating drill collar signal.

18. The device system as recited in claim 17, wherein the plurality of receivers comprises an array of at least 12 receivers.

* * * * *